United States Patent [19]

Haefner et al.

[11] Patent Number: 4,615,321
[45] Date of Patent: Oct. 7, 1986

[54] METHOD AND APPARATUS FOR CHECKING SENSORS

[75] Inventors: Günther Haefner; Bernhard Bauer; Ulrich Letsche, all of Stuttgart; Karl-Ernst Noreikat, Esslingen, all of Fed. Rep. of Germany

[73] Assignee: Daimler-Benz Aktiengesellschaft, Fed. Rep. of Germany

[21] Appl. No.: 637,795

[22] Filed: Aug. 6, 1984

[30] Foreign Application Priority Data

Aug. 6, 1983 [DE] Fed. Rep. of Germany ....... 3328450

[51] Int. Cl.⁴ .................................................. F02B 3/00
[52] U.S. Cl. ....................................... 123/479; 123/564; 340/754; 340/715; 340/286 M; 340/52 R; 364/571
[58] Field of Search .......... 340/754, 518, 715, 286 M, 340/52; 364/571; 123/479, 440, 564

[56] References Cited

U.S. PATENT DOCUMENTS 4,163,224 7/1979 Yasuda ................................ 340/286
4,274,381 6/1981 Abo .................................... 123/440
4,463,355 7/1984 Schultz ............................... 340/754
4,484,290 11/1984 Bagnall .............................. 340/518
4,531,495 7/1985 Yamoto .............................. 123/479

FOREIGN PATENT DOCUMENTS 2050013 12/1980 United Kingdom ............... 123/479

Primary Examiner—Ronald B. Cox
Attorney, Agent, or Firm—Craig & Burns

[57] ABSTRACT

A method and apparatus for checking sensors, in which the measurement signals, electrically detected in a checking unit and representative of the operating conditions of an internal combustion engine, are statically monitored. The measurement signals are checked with respect to whether their physical measured values are technically significant and lie within the permissible range and if an error is detected, a measure is initiated which counteracts this error; the cyclically detected measurement signals are thereby checked with respect to a change in their measured values from one sampling cycle to a successive one and are accepted only if the change in measured values is within permissible limits. Stochastic disturbances are gated out of the measurement signal and registered and tolerated up to a significant limit. If faulty measurement signals are detected, an emergency operating procedure is activated which counteracts this fault.

13 Claims, 8 Drawing Figures

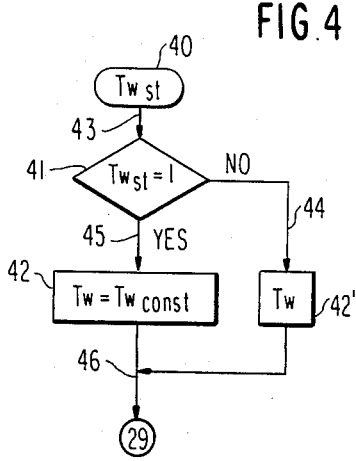
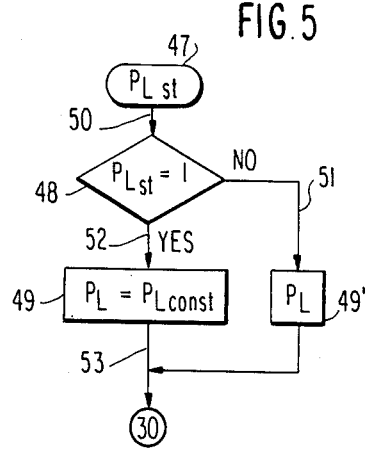
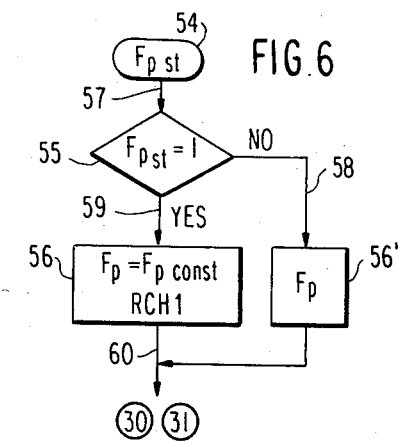
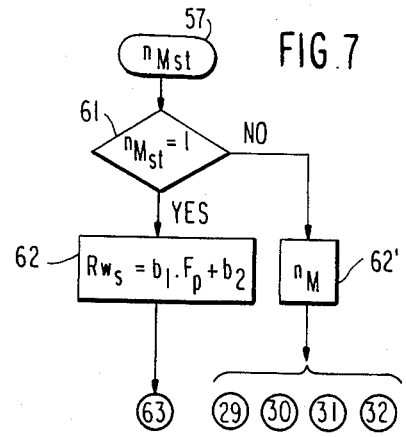
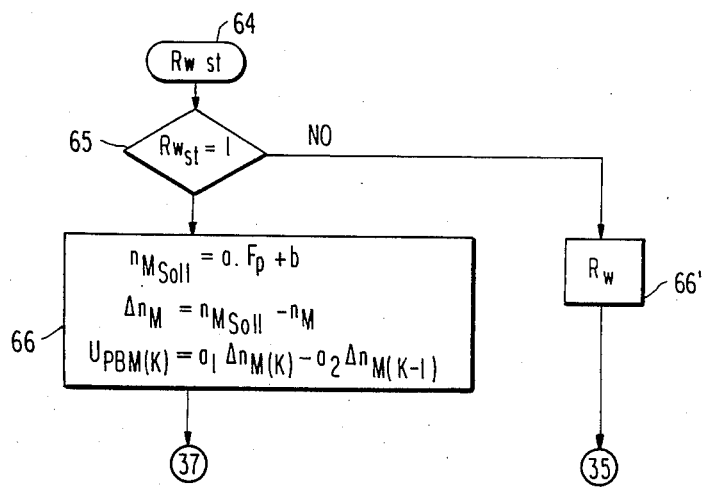

METHOD AND APPARATUS FOR CHECKING SENSORS

The present invention relates to a method and apparatus for checking the proper functioning of sensors, especially of measurement sensors arranged at an internal combustion engine for detecting operating magnitudes of the engine, such as cooling water temperature, whose measurement signals are statically monitored by a checking unit.

An electronic fuel injection control system for internal combustion engines, having a fail-safe function for sensors which detect internal combustion engine operating parameters and which include detection of parameters concerning internal combustion engine operating conditions, has been disclosed in the German Offenlegungsschrift No. 3,206,028. In order to detect disturbances in the sensors for detecting the various internal combustion engine operating condition parameters or in the wires leading to and from the respective sensors, the output signals of the sensors are monitored and checked whether they fall within the output signal range normally present. A disturbance in the sensors for detecting these parameters is read out of a matrix memory as a function of two parameters corresponding to the failed sensors as a parameter describing the then existing condition. However, the disadvantages of this prior art arrangement is the fact that for each sensor an identifying or recognition field generated by two parameters correlated with these sensors is needed, from which a signal describing the operating condition must be read out if the output signal of the sensor is faulty. The checking of the sensor output signals is carried out exclusively statically, that is, it is only checked whether the output signal of the sensor is within a permissible range.

The present invention has the objective of checking measurement signals coming from the aforementioned sensors for their technically significant and physically permissible range and to initiate a counteractive measure if a faulty measurement signal is detected.

The underlying problems are solved according to the present invention in that these measurement signals as also the measured signals of other sensors detecting internal combustion engine operating parameters are cyclically detected and checked with respect to a change in their measured values from one sampling cycle to a successive one and are acceptable only if the change in measured value is within permissible limits, and in that stochastic disturbances are gated out of the measurement signal and are placed into a register, and in that with the occurrence of measured signal disturbances, an auxiliary signal representing the actual value is produced above a predetermined number of faulty measurement signals.

The present invention offers the advantage that in the case of measurement signals displaying stochastic disturbances, the latter are tolerated up to a meaningful, significant limit before a measure counteracting the fault is initiated. In a dynamic measurement signal monitoring system, a change in measured value from one to a successive sampling cycle is checked whether the change is permissible and if a change in measured value is not within a predetermined range, an emergency operating procedure is activated which counteracts this change. During the use of an emergency operating procedure, the availability of the internal combustion engine will be restricted only to a minimum extent in its operating quality, for example, in the power output.

These and other objects, features and advantages of the present invention will become more apparent from the following description when taken in connection with the accompanying drawing which shows, for purposes of illustration only, several embodiments of the present invention, and wherein:

FIG. 4 is a program flow chart of an emergency operating procedure for a faulty cooling-water temperature signal;

FIG. 5 is a program flow chart of an emergency operating procedure for a faulty signal of an air pressure sensor;

FIG. 6 is a program flow chart of an emergency operating procedure for a faulty accelerator pedal signal;

FIG. 7 is a program flow chart of an emergency operating procedure for a faulty internal combustion engine speed signal; and FIG. 8 is a program flow chart of an emergency operating procedure for a faulty control path signal.

Figure 1:
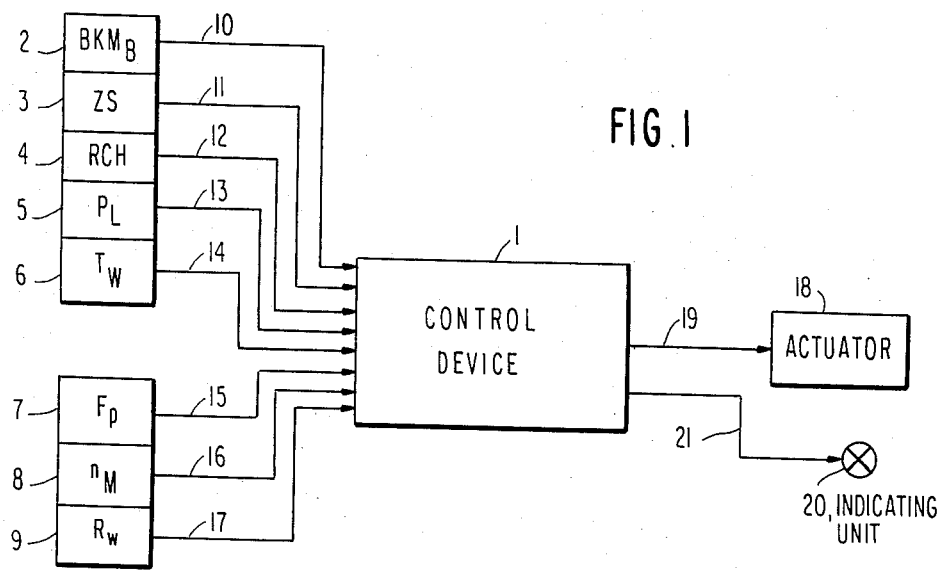
FIG. 1 is a block diagram of a control device in accordance with the present invention, which is provided with a checking unit for the fuel metering of an internal combustion engine.

Referring now to the drawing, a control device designated in FIG. 1 by reference numeral 1 is associated, for example, with three switches 2 to 4 and five sensors 5 to 9 which are connected by way of electric lines 10 to 17 with the input of the control device 1. An actuator 18 is controlled by the control device 1 by way of an electric line 19 and an indicating unit 20 is activated by the control device 1 by way of an electric line 21. A sensor or switch 2 is used to detect the functioning condition of an internal combustion engine brake and a switch 3 is used for detecting an ignition key position. A program switch 4 can be used for selecting control characteristics (RCH). The air pressure of the air supplied to the cylinders of the internal combustion engine is determined by the sensor 5, and the cooling water temperature of a liquid-cooled internal combustion engine is detected by the sensor 6. An accelerator pedal deflection is detected by the sensor 7, an internal combustion engine speed by a sensor 8, and a control-rod deflection of an injection pump associated with a self-igniting internal combustion engine by the sensor 9.

Figure 2:
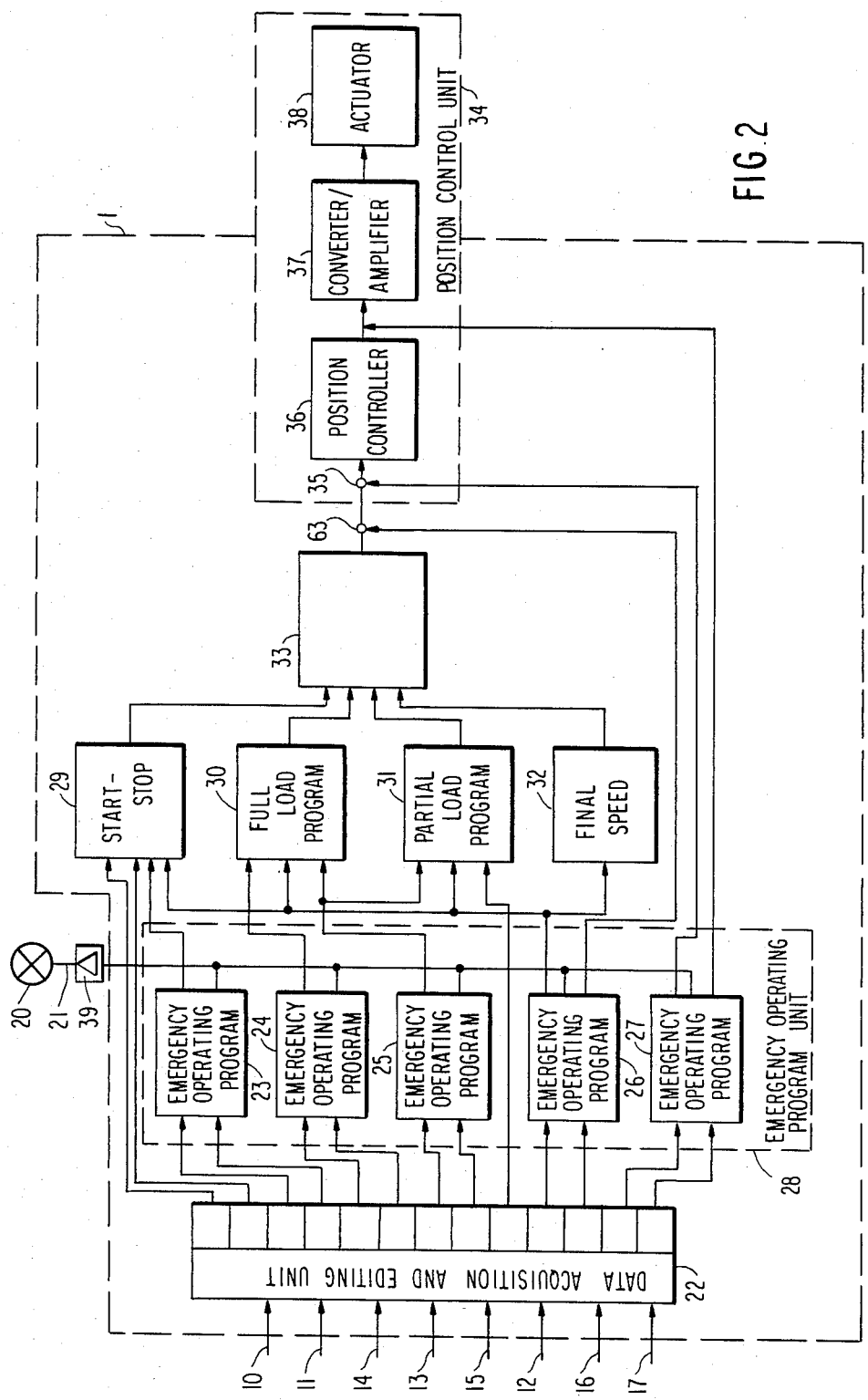
FIG. 2 is a block diagram of a program structure which is used in the control device of FIG. 1.

The control unit 1 comprises a microprocessor in which a program structure represented in FIG. 2 as a block diagram is processed. The program includes a data acquisition and data editing (preparation) block 22, a emergency operating program block 28 which includes the emergency operating programs 23 to 27, a start/stop program block 29, a program block 30 for the determination of the full-load line characteristic of the internal combustion engine identification field, a program block 31 for determining the partial-load identification fields for different operating programs of an internal combustion engine and an internal combustion engine idling and final speed program block 32. From the signals fed to a program block 33, the instantaneously correct control-rod travel signal is determined which is fed to a position control circuit 34. The position control circuit 34 includes a summing point 35, a position controller block 36, and a converter/amplifier unit 37 which influences an actuator 38. The individual blocks are connected by way of signal paths which transmit several signals. The measurement signals of the sensors 5 to 9, read sequentially into the data acquisition and data editing block 22, are checked with respect to their measured value and with respect to a change in their measured value relative to the measurement signal previously read-in to see if a measured value or a change in measured value is within a permissible range of change or range of measured values. If it is found, for example, five times in succession that the measurement signal of a sensor or a change in measured value is not within a predetermined range of measured values or range of change, an entry is made in a "disturbance register" associated with this measurement signal. This disturbance signal monitoring system (stochastic disturbances) does not immediately carry out an automatic response as soon as a faulty measurement signal is detected. Instead, these disturbance signals are tolerated up to a significant meaningful limit. The disturbance register content of block 22 is checked in the emergency operating program block 28. At the output of the emergency operating program block 28, the updated signals are fed to program blocks 29 to 32 (German Offenlegungsschrift No. 28 20 807) and the position control circuit 34 (German patent application No. P 32 07 392.5-52). If an emergency operating program is activated, this will also drive an amplifier 39 which, in turn, influences the indicating unit 20 via the line 21.

Figure 3:
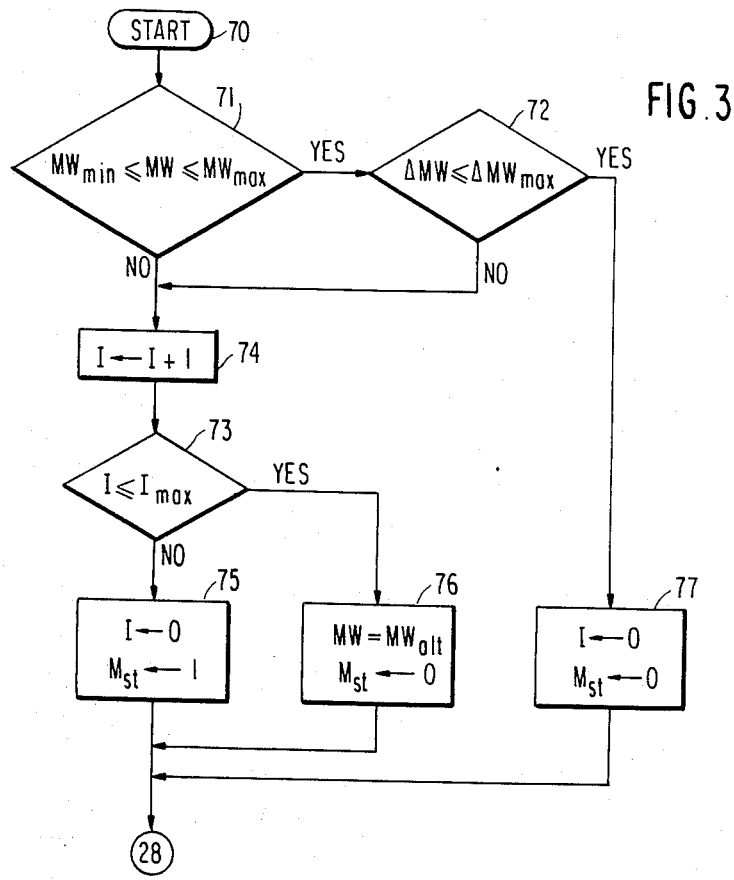
FIG. 3 is a program flow chart of data acquisition and data error detection.

The signals supplied to the input of block 22 via lines 13 to 17 are checked in accordance with a program flow chart as shown in FIG. 3 and perfectly associated with each sensor. The program flow chart comprises a terminal 70, branches 71 to 73, operational blocks 74 to 76 and flow lines connecting the latter. At branch 71, a check is performed whether the measured value lies within a predetermined band width. If the value of the measured value is outside the test limits, then the program branches to the operational block 74. If the interrogation in branch block 71 showed that the measured value is within the test limit, the program branches to the branch block 72, in which a check of a measured value change is executed, that is, a check is performed whether the measured value does not exceed a measured value change with respect to the measured value determined previously in time. If the determined measured value change is outside the test limit, then the program branches to the operation block 74. If the measured value change is within the test limit, the program branches to the operational block 77, in which a counter I and a disturbance register $M_{st}$ associated with the measured value is set to zero.

In the operational block 74, the signal fed to the operational block 74 by the branch block 71, 72 has the effect that the counter I is incremented by one. In the branch block 73, the counter is checked whether it has not yet exceeded the maximum value, for example, 5, and the program then branches to the operational block 76 in which, instead of the currently measured value, the previously measured value is used for further execution in block 28. The disturbance register associated with the measured value is set to zero. If the interrogation in branch block 73 shows that the counter I is equal to or greater than $I_{max}$, the program then branches to the operational block 75 in which the counter is set to zero and the disturbance register associated with the measured value is set to one. The output signal of the operational blocks 75 to 77 is fed to the emergency operating program block 28.

A program flow chart, shown in FIG. 4, for the emergency temperature operating procedure comprises a terminal 40, a branch 41, operational blocks 42, 42' and flow lines 43 to 46 connecting the latter. In branch 41, the contents of the disturbance register are interrogated. If the disturbance register has the value 1, the program branches to the operational block 42 and, instead of the measured value, the calculation is continued with a predetermined fixed value leading to a non-critical situation during the operation of the internal combustion engine. Simultaneously therewith, the indicating unit 20 is activated by way of the amplifier 38 which is activated by the disturbance register. If the interrogation in the branch block 41 shows that the value of the disturbance register is not equal to one, the program then branches to the operational block 42' and the measured value is used for further calculation in the program block 29.

A program flow chart, shown in FIG. 5, of an emergency operating procedure for a faulty signal of an air-pressure sensor (supercharge pressure sensor) comprises a terminal 47, a branch 48, operational blocks 49, 49' and flow lines 50 to 53 connecting the latter. At branch 48, the contents of the disturbance register are interrogated. If the disturbance register has the value 1, the program branches to the operational block 49 and, instead of the measured value, the calculation is continued with a predetermined fixed value leading to a non-critical situation during the operation of the internal combustion engine. Simultaneously therewith, the indicating unit 20 activated by the disturbance register via the amplifier signals that an emergency operating program has been activated. If an interrogation in the branch block 48 shows that the value of the disturbance register is not equal to 1, then the program branches to the operational block 49' and the measured value is used in the program block 30 (German Offenlegungsschrift No. 28 20 807) for further calculation.

A program flow chart, shown in FIG. 6, of an emergency operating procedure for a faulty accelerator pedal position signal comprises a terminal 54, a branch 55, operational blocks 56, 56' and flow lines 57 to 60 connecting the latter. At branch 55, the contents of the disturbance register associated with the accelerator pedal position signal are interrogated. If the disturbance register has the value 1, the program branches to the operational block 56 and, instead of the measured value, the calculation is continued with a predetermined fixed value leading to a non-critical situation during operation of the internal combustion engine and with a speed control characteristic (RCH=1). Simultaneously therewith, the indicating unit 20 activated by the disturbance register via the amplifier 29 signals that an emergency operating program has been activated. If the interrogation at the branch block 55 shows that the value of the disturbance register is not equal to 1, then the program branches to the operational block 56' and the measured value is used in program block 30, 31 (German Offenlegungsschrift No. 28 20 807) for further calculation.

If a disturbance register, associated with the internal combustion engine speed signal has the value 1, when a faulty measurement signal of the internal combustion engine speed sensor 8 is present, the program branches to the operational block 62 in a branch block 61 of the program flow chart according to FIG. 7. In the operational block 62, a control path value is calculated from the accelerator pedal position signal in accordance with the linear function $RW_s = b_1 \times F_p + b_2$, where $b_1$ and $b_2$ are predetermined constants and $F_p$ is the accelerator pedal position signal determined by the sensor 7. The output signal of the operational block 62 is fed to a summing point 63 associated with the position control circuit 34. This control signal is of such magnitude that the full-load range of the internal combustion engine is limited to $\frac{2}{3}$ of the full-load range capacity. The internal combustion engine is influenced exclusively via the accelerator pedal which is associated in this arrangement with a pure filling regulator characteristic. If the interrogation in branch block 61 shows that the value of the disturbance register is not equal to one, then the program branches via an operational block 62' to the program blocks 29 to 32. If the operational block 62 is activated, the indicating unit 20 is driven via the amplifier 39.

A program flow chart for a faulty measurement signal of the control path sensor 9 is provided, in accordance with FIG. 8, with a terminal 64, a branch 65 and operational blocks 66, 66' which are connected via flow lines. If a check of the disturbance register associated with the control path measurement signal shows that its value is not equal to 1, the program branches via the operational block 66' showing the measured value to the summing point 35 in the position control circuit 34. If the value of the disturbance register is equal to 1, the program branches to operational block 66. In a first function in dependence on the accelerator pedal position signal $F_p$ and two constants a,b, the nominal internal combustion engine speed $n_{M\ Soll}$ is determined. After subtracting the internal combustion engine speed $n_M$ from the nominal internal combustion engine speed $n_{M\ Soll}$, a speed difference $\Delta n_M$ is obtained. In a subsequent function $U_{PBM\ (K)} = a_1 \cdot \Delta n_M\ (K) - a_2 \Delta n_M\ (K-1)$, $U_{PBM(K)}$ is a voltage signal for a pulse-width-modulated signals, $a_1$ and $a_2$ are constants, $\Delta n_{M(K)}$ is a speed difference as then determined and $\Delta n_{M(K-1)}$ is a speed difference determined prior to that. This function describes a speed regulator having a PD structure in digitalized form. The output signal of the operational block 66 is fed to the converter/amplifier unit 37 in the position control circuit 34.

While we have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

We claim:

1. A method for checking the operability of sensor means in an internal combustion engine and detecting operating conditions of the internal combustion engine, and in which the measurement signals thereof are statically monitored in a checking unit, comprising the steps of cyclically detecting the measurement signals of the sensor means detecting internal combustion engine operating parameters and checking the same with respect to a change in their measured values from one sampling cycle to a successive one, and accepting the measurement signals only if the change in measured value is within permissible limits, gating stochastic disturbances out of the measurement signal and registering the same, and in case of a recurrence of measured signal disturbances, producing an auxiliary signal representing the actual measured value above a predetermined number of faulty measurement signals and wherein the internal combustion engine is operatively connected with an air charge device, and wherein, in case of a faulty measurement signal of an air-pressure sensor means, the operation is changed from supercharged internal combustion engine operation to a suction-type internal combustion engine operation.

2. A method for checking the operability of sensor means in an internal combustion engine and detecting operating conditions of the internal combustion engine, and in which the measurement signals thereof are statically monitored in a checking unit, comprising the steps of cyclically detecting the measurement signals of the sensor means detecting internal combustion engine operating parameters and checking the same with respect to a change in their measured values from one sampling cycle to a successive one, and accepting the measurement signals only if the change in measured value is within permissible limits, gating stochastic disturbances out of the measurement signal and registering the same, and in case of a recurrence of measured signal disturbances, producing an auxiliary signal representing the actual measured value above a predetermined number of faulty measurement signals and wherein in the event of a failure of an internal combustion engine revolution sensor means, a control rod of the fuel metering system of a self-igniting internal combustion engine is adjusted proportionally to the accelerator pedal deflection and the full load range of the internal combustion engine is limited to about $\frac{2}{3}$ of its capacity.

3. A method for checking the operability of sensor means in an internal combustion engine and detecting operating conditions of the internal combustion engine, and in which the measurement signals thereof are statically monitored in a checking unit, comprising the steps of cyclically detecting the measurement signals of the sensor means detecting internal combustion engine operating parameters and checking the same with respect to a change in their measured values from one sampling cycle to a successive one, and accepting the measurement signals only if the change in measured value is within permissible limits, gating stochastic disturbances out of the measurement signal and registering the same, and in case of a recurrence of measured signal disturbances, producing an auxiliary signal representing the actual measured value above a predetermined number of faulty measurement signals and wherein the operating condition of the internal combustion engine can be described by means of the internal combustion engine operating parameters of engine cooling water temperature, accelerator pedal position, connecting rod travel of a fuel metering system of a self-igniting internal combustion engine, internal combustion engine revolutions, pressure of the air supplied to the cylinders of the internal combustion engine, and fuel temperature and wherein in the event of a failure of an internal combustion engine revolution sensor means, a control rod of the fuel metering system of a self-igniting internal combustion engine is adjusted proportionally to the accelerator pedal deflection and the full load range of the internal combustion engine is limited to about $\frac{2}{3}$ of its capacity.

4. A method for checking the operability of sensor means in an internal combustion engine and detecting operating conditions of the internal combustion engine, and in which the measurement signals thereof are statically monitored in a checking unit, comprising the steps of cyclically detecting the measurement signals of the sensor means detecting internal combustion engine operating parameters and checking the same with respect to a change in their measured values from one sampling cycle to a successive one, and accepting the measurement signals only if the change in measured value is within permissible limits, gating stochastic disturbances out of the measurement signal and registering the same, and in case of a recurrence of measured signal disturbances, producing an auxiliary signal representing the actual measured value above a predetermined number of faulty measurement signals and wherein the internal combustion engine is associated with a cascade position control circuit, a speed control circuit and a fuel metering system, and wherein in the event of a failure of a control rod sensor means, the internal-combustion engine speed is influenced by a further speed control circuit without cascade position control circuit.

5. A checking unit for checking the operability of sensor means in an internal combustion engine for detecting operating conditions of the internal combustion engine, and in which the measurement signals of the sensor means are statically monitored, comprising means for cyclically detecting the measurement signals of the sensor means detecting internal combustion engine operating parameters and for checking the same with respect to a change in their measured values from one sampling cycle to a successive one including means for accepting the measurement signals only if the change in measured value is within permissible limits, means for gating stochastic disturbances out of the measurement signals and for registering the same, and means for producing, in case of recurrence of measured signal disturbances, an auxiliary signal representing the actual measured value above a predetermined number of faulty measurement signals, wherein the operating condition of the internal combustion engine can be described by means of the internal combustion engine operating parameters including engine cooling water temperature, accelerator pedal position, connecting rod travel of a fuel metering system of a self-igniting internal combustion engine, internal combustion engine revolutions, pressure of the air supplied to the cylinders of the internal combustion engine, and fuel temperature, and wherein the internal combustion engine is associated with an air charge means, and wherein, in the event of a faulty measurement signal of an air-pressure sensor means, the operation is changed from supercharged internal combustion engine operation to suction-type internal combustion engine operation.

6. A checking unit for checking the operability of sensor means in an internal combustion engine for detecting operating conditions of the internal combustion engine, and in which the measurement signals of the sensor means are statically monitored, comprising means for cyclically detecting the measurement signals of the sensor means detecting internal combustion engine operating parameters and for checking the same with respect to a change in their measured values from one sampling cycle to a successive one including means for accepting the measurement signals only if the change in measured value is within permissible limits, means for gating stochastic disturbances out of the measurement signals and for registering the same, and means for producing, in case of recurrence of measured signal disturbances, an auxiliary signal representing the actual measured value above a predetermined number of faulty measurement signals, wherein the operating condition of the internal combustion engine can be described by means of the internal combustion engine operating parameters including engine cooling water temperature, accelerator pedal position, connecting rod travel of a fuel metering system of a self-igniting internal combustion engine, internal combustion engine revolutions, pressure of the air supplied to the cylinders of the internal combustion engine, and fuel temperature, and wherein, in the event of a failure of an internal combustion engine revolution sensor means, a control rod of the fuel metering system of a self-igniting internal combustion engine is adjusted proportionally to the accelerator pedal deflection and the full load range of the internal combustion engine is limited to about ⅔ of its capacity.

7. A checking unit for checking the operability of sensor means in an internal combustion engine for detecting operating conditions of the internal combustion engine, and in which the measurement signals of the sensor means are statically monitored, comprising means for cyclically detecting the measurement signals of the sensor means detecting internal combustion engine operating parameters and for checking the same with respect to a change in their measured values from one sampling cycle to a successive one including means for accepting the measurement signals only if the change in measured value is within permissible limits, means for gating stochastic disturbances out of the measurement signals and for registering the same, and means for producing, in case of recurrence of measured signal disturbances, an auxiliary signal representing the actual measured value above a predetermined number of faulty measurement signals, wherein the operating condition of the internal combustion engine can be described by means of the internal combustion engine operating parameters including engine cooling water temperature, accelerator pedal position, connecting rod travel of a fuel metering system of a self-igniting internal combustion engine, internal combustion engine revolutions, pressure of the air supplied to the cylinders of the internal combustion engine, and fuel temperature, and wherein the internal combustion engine is associated with a cascade position control circuit means, a speed control circuit means and a fuel metering system, and wherein in the event of a failure of a control rod sensor means, the internal-combustion engine speed is influenced by a further speed control circuit means devoid of cascade position control circuit means.

8. A checking unit for checking the operability of sensor means in an internal combustion engine and detecting operating conditions of the internal combustion engine, and in which the measurement signals thereof are statically monitored in a checking unit, comprising the steps of cyclically detecting the measurement signals of the sensor means detecting internal combustion engine operating parameters and checking the same with respect to a change in their measured values from one sampling cycle to a successive one, and accepting the measurement signals only if the change in measured value is within permissible limits, gating stochastic disturbances out of the measurement signal and registering the same, and in case of a recurrence of measured signal disturbances, producing an auxiliary signal representing the actual measured value above a predetermind number of faulty measurement signals, the internal combustion engine including an accelerator pedal, one of said sensor means being a control rod sensor, the checking unit including means operable in the event of a failure of the accelerator pedal and of the control-rod travel sensor means to adjust a predetermined internal combustion engine speed, further comprising means for activating an indicating unit characterizing the emergency operating procedure after activation of the respective emergency operating procedure, wherein the operating condition of the internal combustion engine can be described by means of the internal combustion engine operating parameters including engine cooling water temperature, accelerator pedal position, connecting rod travel of a fuel metering system of a self-igniting internal combustion engine, internal combustion engine revolutions, pressure of the air supplied to the cylinders of the internal combustion engine, and fuel temperature wherein in the event of a faulty measurement signal of an engine cooling water temperature sensor means, a predetermined cooling water temperature leading to a low fuel injection quantity is used instead of the measured value and in which the internal combustion engine is associated with an air charge means, and wherein, in the event of a faulty measurement signal of an air-pressure sensor means, the operation is changed from supercharged internal combustion engine operation to suction-type internal combustion engine operation.

9. A method according to claim 4, wherein the operating condition of the internal combustion engine can be described by means of the internal combustion engine operating parameters of cooling water temperature, accelerator pedal position, connecting rod travel of a fuel metering system of a self-igniting internal combustion engine, internal combustion engine revolutions, pressure of the air supplied to the cylinders of the internal combustion engine, and fuel temperature.

10. A method according to claim 9, wherein, in case of a faulty measurement signal of a cooling water temperature sensor means, a predetermined cooling water temperature leading to a low fuel injection quantity is used instead of the measured value.

11. A method according to claim 10, wherein the internal combustion engine is operatively connected with an air charge device, and wherein, in case of a faulty measurement signal of an air-pressure sensor means, the operation is changed from supercharged internal combustion engine operation to a suction-type internal combustion engine operation.

12. A checking unit according to claim 8, wherein, in the event of a failure of an internal combustion engine revolution sensor means, a control rod of the fuel metering system of a self-igniting internal combustion engine is adjusted proportionally to the accelerator pedal deflection and the full load range of the internal combustion engine is limited to about $\frac{2}{3}$ of its capacity.

13. A checking unit according to claim 12, wherein the internal combustion engine is associated with a cascade position control circuit means, a speed control circuit means and a fuel metering system, and wherein in the event of a failure of a control rod sensor means, the internal-combustion engine speed is influenced by a further speed control circuit means devoid of cascade position control circuit means.

* * * * *